US010208670B2

(12) United States Patent
Gerendas et al.

(10) Patent No.: US 10,208,670 B2
(45) Date of Patent: Feb. 19, 2019

(54) GAS-TURBINE COMBUSTION CHAMBER WITH IMPINGEMENT-COOLED BOLTS OF THE COMBUSTION CHAMBER TILES

(71) Applicant: Rolls-Royce Deutschland Ltd & Co KG, Blankenfelde-Mahlow (DE)

(72) Inventors: Miklos Gerendas, Am Mellensee (DE); Maren Fanter, Teltow (DE); Volker Herzog, Zeuthen (DE); Sermed Sadig, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 1707 days.

(21) Appl. No.: 13/971,328

(22) Filed: Aug. 20, 2013

(65) Prior Publication Data

US 2017/0298824 A1 Oct. 19, 2017

(30) Foreign Application Priority Data

Aug. 21, 2012 (DE) .......................... 10 2012 016 493

(51) Int. Cl.
*F23R 3/06* (2006.01)
*F02C 7/18* (2006.01)
(Continued)

(52) U.S. Cl.
CPC .................. *F02C 7/18* (2013.01); *F01P 1/00* (2013.01); *F02C 7/12* (2013.01); *F02C 7/20* (2013.01);
(Continued)

(58) Field of Classification Search
CPC .. F23R 3/002; F23R 2900/03044; F23R 3/06; F02C 7/12; F02C 7/18; F02C 7/20; F01P 1/00; F01P 2050/20; F05D 2260/201
See application file for complete search history.

(56) References Cited

U.S. PATENT DOCUMENTS 4,085,580 A * 4/1978 Slattery .................. F23R 3/002
60/756
4,184,326 A 1/1980 Pane et al.
(Continued)

FOREIGN PATENT DOCUMENTS

DE 10 2007 018 061 10/2008
EP 2295865 3/2011
(Continued)

OTHER PUBLICATIONS

European Search Report dated Nov. 17, 2017 for counterpart European Application No. EP13181040.0.
(Continued)

*Primary Examiner* — Gerald L Sung
*Assistant Examiner* — Marc Amar
(74) *Attorney, Agent, or Firm* — Shuttleworth & Ingersoll, PLC; Timothy J. Klima

(57) ABSTRACT

The present invention relates to a gas-turbine combustion chamber having a combustion chamber wall, to which combustion chamber tiles are fastened by means of bolts, where in the bolt fastening area in the combustion chamber wall at least one impingement cooling hole is provided, the center axis of which is inclined to the center axis of the bolt and intersects a transition area between the bolt and the combustion chamber tile.

8 Claims, 5 Drawing Sheets

Figure 1:
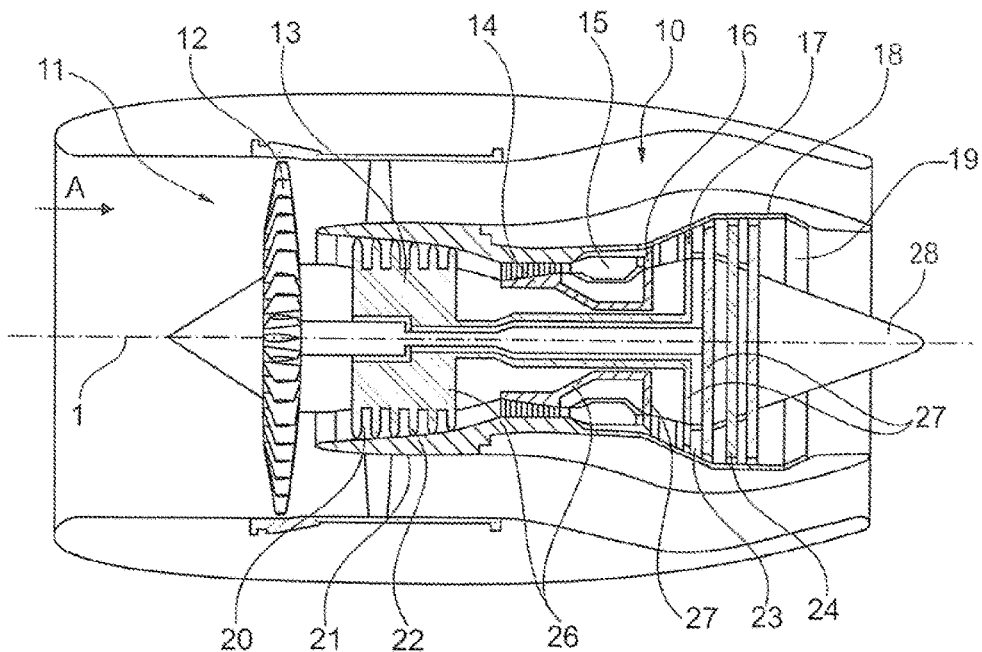

(51) Int. Cl.
*F02C 7/20* (2006.01)
*F01P 1/00* (2006.01)
*F02C 7/12* (2006.01)
*F23R 3/00* (2006.01)
*F23R 3/60* (2006.01)

(52) U.S. Cl.
CPC ............... *F23R 3/002* (2013.01); *F23R 3/06* (2013.01); *F23R 3/60* (2013.01); *F01P 2050/20* (2013.01); *F05D 2220/32* (2013.01); *F05D 2240/35* (2013.01); *F05D 2250/141* (2013.01); *F05D 2260/201* (2013.01); *F23R 2900/03044* (2013.01)

(56) References Cited

U.S. PATENT DOCUMENTS

| | | | |
|---|---|---|---|
| 5,000,005 A | 3/1991 | Kwan et al. | |
| 5,113,660 A * | 5/1992 | Able | F23R 3/002 110/339 |
| 5,183,385 A * | 2/1993 | Lee | F01D 5/20 415/115 |
| 5,333,443 A * | 8/1994 | Halila | F23R 3/002 60/752 |
| 5,363,643 A * | 11/1994 | Halila | F23R 3/002 60/752 |
| 5,758,503 A * | 6/1998 | DuBell | F23R 3/002 60/752 |
| 5,964,575 A * | 10/1999 | Marey | F01D 25/12 415/115 |
| 6,711,900 B1 | 3/2004 | Patel et al. | |
| 7,559,203 B2 * | 7/2009 | Stastny | F23R 3/60 60/796 |
| 8,099,961 B2 | 1/2012 | Gerendas | |
| 2002/0168264 A1 * | 11/2002 | Weigand | F01D 5/187 416/97 R |
| 2003/0123953 A1 | 7/2003 | Razzell | |
| 2007/0062202 A1 * | 3/2007 | Stastny | F23R 3/60 60/796 |
| 2008/0127652 A1 | 6/2008 | Putz | |
| 2010/0242487 A1 * | 9/2010 | Davis, Jr. | F01D 9/023 60/772 |
| 2010/0263386 A1 * | 10/2010 | Edwards | F23R 3/002 60/796 |
| 2010/0307162 A1 | 12/2010 | Bottcher et al. | |
| 2011/0011095 A1 | 1/2011 | Ladd et al. | |
| 2014/0023490 A1 * | 1/2014 | Hillier | F01D 11/005 415/173.6 |
| 2015/0362192 A1 * | 12/2015 | Cunha | F23R 3/002 60/772 |
| 2016/0123186 A1 * | 5/2016 | Stover | F01D 11/24 415/116 |
| 2017/0101932 A1 * | 4/2017 | Stover | F01D 5/189 |

FOREIGN PATENT DOCUMENTS

| | | |
|---|---|---|
| GB | 2087065 | 5/1982 |
| GB | 2380236 A | 4/2003 |
| WO | 92/16798 | 10/1992 |
| WO | 2006/064038 | 6/2006 |

OTHER PUBLICATIONS

German Search Report dated Apr. 2, 2013 from counterpart App No. 10 2012 016 493.9.

* cited by examiner

GAS-TURBINE COMBUSTION CHAMBER WITH IMPINGEMENT-COOLED BOLTS OF THE COMBUSTION CHAMBER TILES

This application claims priority to German Patent Application 10 2012 016 493.9 filed Aug. 21, 2012, the entirety of which is incorporated by reference herein.

This invention relates to a gas-turbine combustion chamber having a combustion chamber wall, to which combustion chamber tiles are fastened by means of bolts.

The state of the art shows different cooling concepts for cooling the tiles of the combustion chamber. To do so, recesses are used for both impingement cooling and effusion cooling. In detail, the state of the art shows the following solutions by way of examples:

WO 92/16798 A1 describes the structure of a gas-turbine combustion chamber using metallic tiles fastened by means of stud bolts, which due to the combination of impingement and effusion cooling results in effective cooling and hence permits a reduction in cooling air consumption. However, the pressure loss which exists across the wall is split over two throttling points, the tile carrier and the tile itself. To prevent peripheral leakage, the greater part of the pressure loss is mostly generated via the tile carrier, reducing the tendency of the cooling air to flow past the effusion tile.

GB 2087065 A1 describes a tile cooling configuration with a pinned or ribbed tile, where every individual impingement cooling jet is protected from the transverse flow by an upstream-located pin or rib on the tile. Furthermore, the pins or ribs increase the area available for heat transfer.

GB 2356041 A1 describes the combination of impingement/effusion-cooled and pinned tiles. The cooling of the base of the bolt via effusion holes is also described here. Effusion holes through the base of the bolt are therefore also proposed in order to reduce the temperature in this highly stressed area.

US 2011/0011095 A describes the provision of additional impingement cooling holes in the washer of the fastening nut on the stud bolt of the tile. The tile carrier is shown with an oblong hole. This arrangement therefore only permits one-sided cooling of the transition area between stud bolt and tile.

EP 2 295 865 A2 describes cooling of the transition area between the tile and separate screws via a hat-shaped washer with cooling openings. The axes of the cooling openings also meet at one point and on the axes of the screw. However, this happens at a great distance from the transition area between the screws and the tile or between the tile and the cylindrical thickened area for receiving the screw inside a thread.

DE 10 2007 018 061 A1 describes different possibilities for structuring the surface of a tile, where the impingement cooling jets impact, in such a way that heat transfer is increased.

Both types of tiles, i.e. impingement/effusion-cooled as well as pinned tiles, are fastened to the combustion chamber wall by means of stud bolts. These fastening elements block the cooling mechanism described in the state of the art. In areas, where a stud bolt is integrally cast on the tile, there are no more pins through which air can flow and absorb heat. The base of the bolt is, due to the tightening of the nut on the stud bolt, a mechanically highly stressed area which should not be additionally weakened by cooling air holes. If however the base of the bolt is not sufficiently cooled, it overheats and the service life of the tile is shortened.

The object underlying the present invention is to provide a gas-turbine combustion chamber of the type specified at the beginning which, while being simply designed and easily and cost-effectively producible, guarantees effective cooling of the tiles.

It is a particular object of the present invention to provide solution to the above problematics by a combination of the features of claim 1. Further advantageous embodiments of the present invention become apparent from the sub-claims.

In accordance with the invention, it is thus provided that cooling air is additionally supplied through the combustion chamber wall (tile carrier). This cooling air is supplied such that it impacts the root area of the bolt or the transition area between the bolt and the tile as impingement cooling air. In particular in the case of bolts cast together with the tile, the transition area is rounded, so that an effective cooling flow can be directed onto the surface formed by the rounded area, said flow spreading evenly and leading to effective cooling of the transition area between the bolt and the tile.

The rounded area can be designed most simply with a constant radius. If however the strength of the transition is to be increased, an elliptically shaped rounded area is advantageous where a greater radius is used for the tile in order to spread the fastening load to a large area, and a smaller radius is used for the bolt such that the rounded area ends before the thread of the stud bolt starts. The surface created by the rounded area is then in its simplest form a part of a circle-based or ellipse-based torus (an ellipse-based torus or elliptic torus is understood in the following to be the surface obtained from the rotation of an ellipse instead of the usual circle about an axis outside the ellipse or circle).

Due to the design in accordance with the invention, there is no weakening whatsoever of the tile in the fastening area of the bolt, since in accordance with the invention no additional holes or recesses are required there, and instead there is an effective supply of cooling air through the combustion chamber wall.

To achieve symmetrical and even cooling, it is particularly advantageous when several impingement cooling holes are provided whose center axes intersect the center axis of the bolt. These several impingement cooling holes can be arranged either evenly spread or unevenly (asymmetrically) around the circumference of the bolt.

The inclination of the impingement cooling holes is preferably designed such that the intersection point of the center axes of the impingement cooling holes is located on the hot gas side of the combustion chamber tile and meets the center axis of the bolt.

In accordance with the invention, additional impingement cooling holes are therefore drilled through the tile carrier (combustion chamber wall), which are aligned such that they meet the tile at the transition between the bolt and the tile in the surface formed by the rounded area with a constant or variable radius, in order to draw the heat out of this area.

In accordance with the invention, the impingement cooling jets can be aligned such that the axes of the additional impingement cooling holes for bolt cooling intersect at a point.

Additionally, the impingement cooling jets can be aligned such that the axes of the additional impingement cooling holes for bolt cooling intersect at a point located on the axis of the bolt.

In particular, the impingement cooling jets can be aligned such that the axes of the additional impingement cooling holes for bolt cooling intersect at a point on the hot gas side surface of the tile, said point being also located on the axis of the bolt.

The substantially circular or elliptic torus-shaped rounded area is in its simplest form a smooth and unstructured surface. As is known, the heat transfer can be increased by structuring the surface with ribs, prisms, pins etc. In accordance with the invention, these known measures can also be applied to the rounded area, where the structure is established on the mechanically necessary rounded area and does not cut into it.

The solution in accordance with the invention can be used not only for cooling integrally cast stud bolts, but also for cooling separate screws in the same way, where here too it is aimed at the transition area between screw and tile or between tile and thickened area of the tile for receiving the screw in a thread (where provided).

This additional air is blown through the tile via a few locally enlarged or additional effusion holes in such a way that the base of the bolt is not weakened by the provision of the hole. This is achieved in that the projection of the stud bolt diameter onto the hot gas side surface of the metallic part of the tile is not penetrated by an effusion hole.

In accordance with the invention, this results in the following advantages, among others:

In areas, where the impingement cooling jets impact the transition between the bolt and the tile, they draw a particularly large amount of heat out of this zone.

Due to the locally enlarged or additional effusion holes, film cooling on the hot gas side of the combustion chamber is improved and hence the heat transfer into the tile and its bolt is additionally locally reduced at that point where the axis of the bolt penetrates the hot gas side surface of the tile.

By reducing the temperature of the bolt using which the tile is fastened, the service life of this connection is drastically prolonged.

Figure 2:
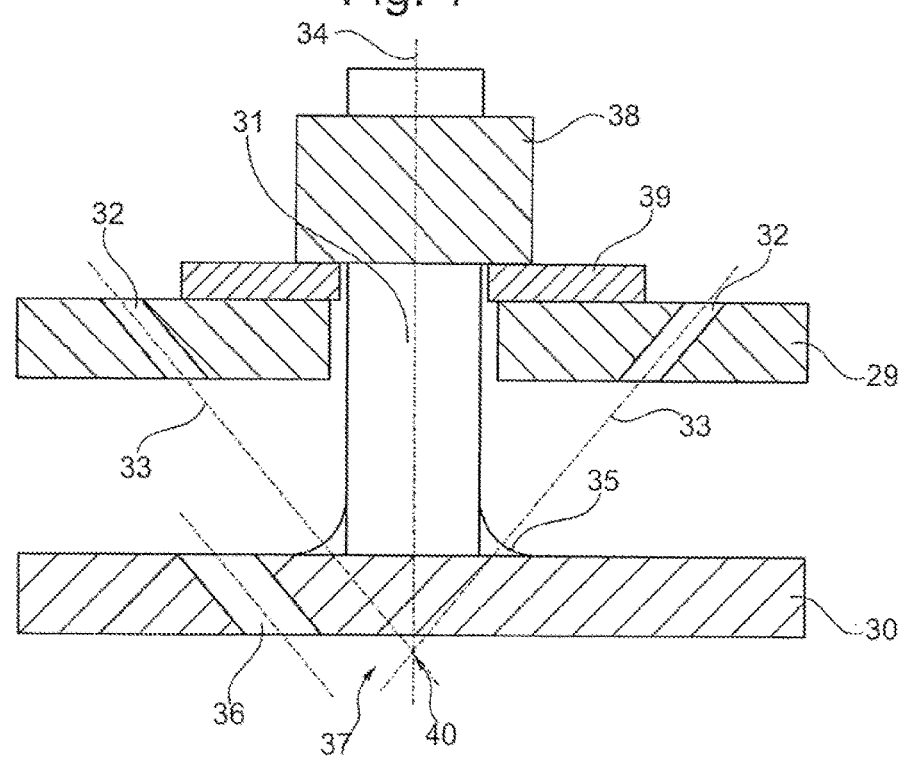
Figure 3:
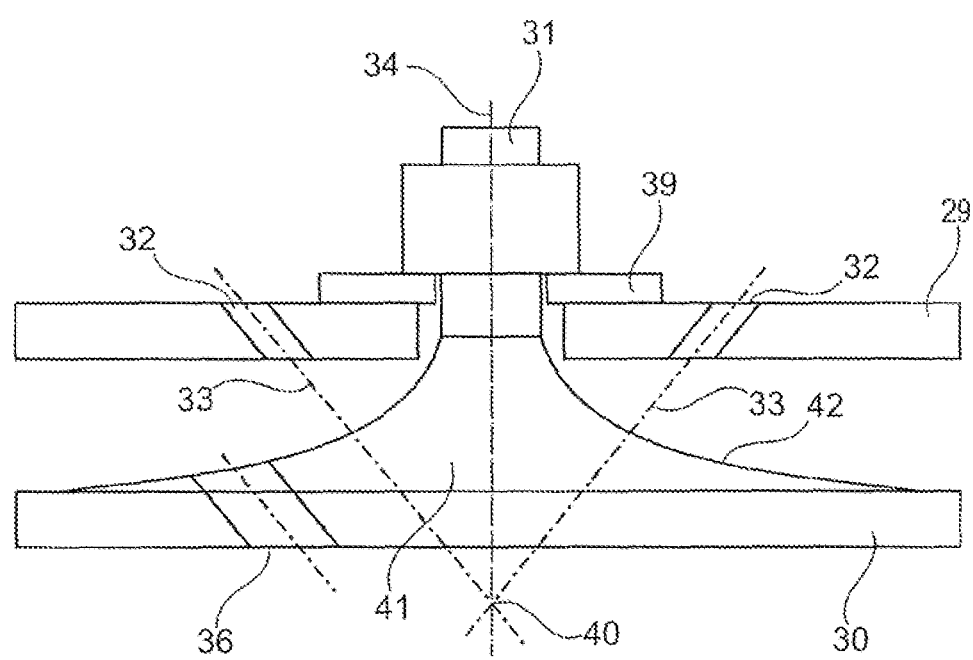
Figure 4:
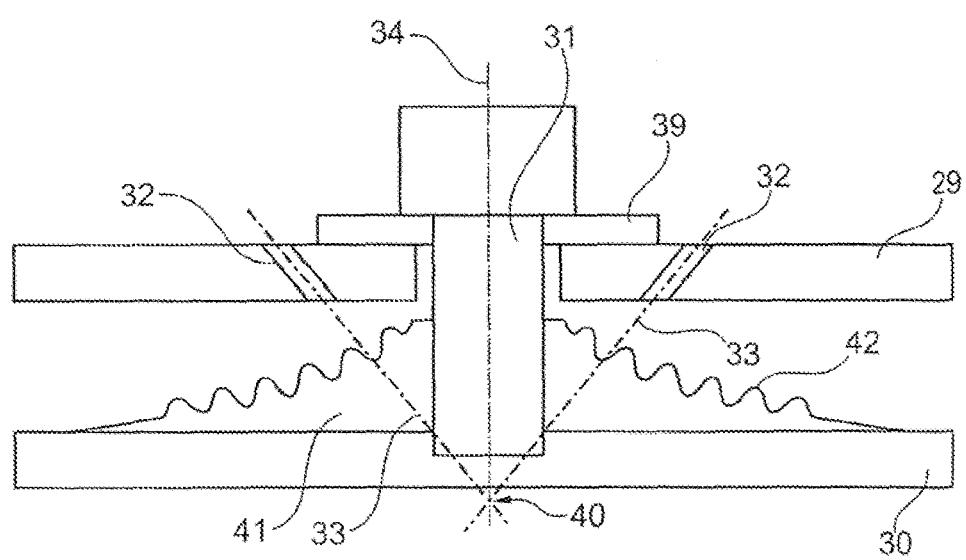
Figure 5:
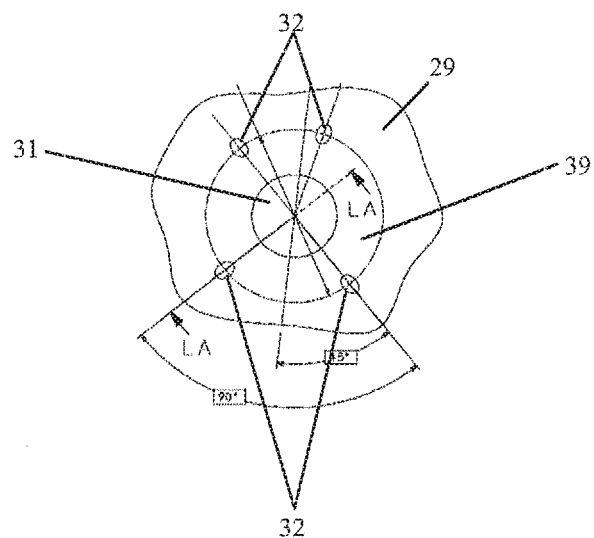
Figure 6:
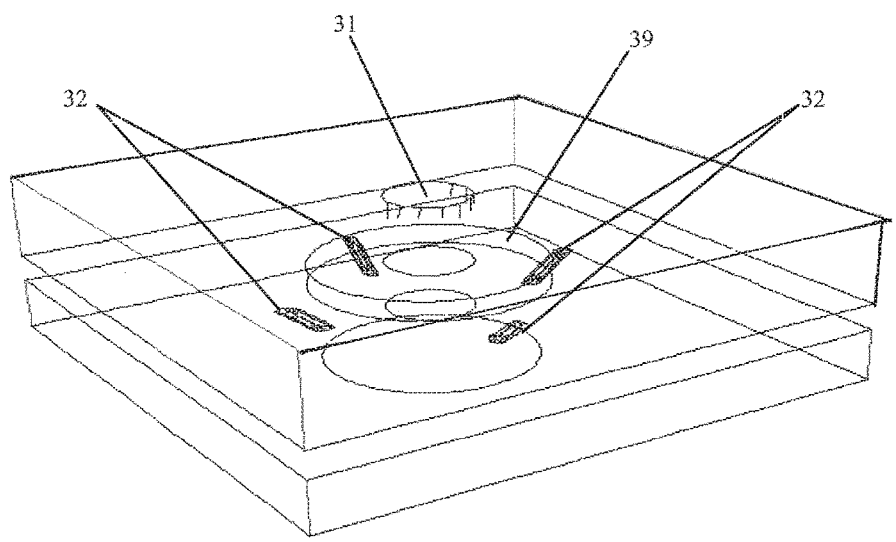
Figure 7:
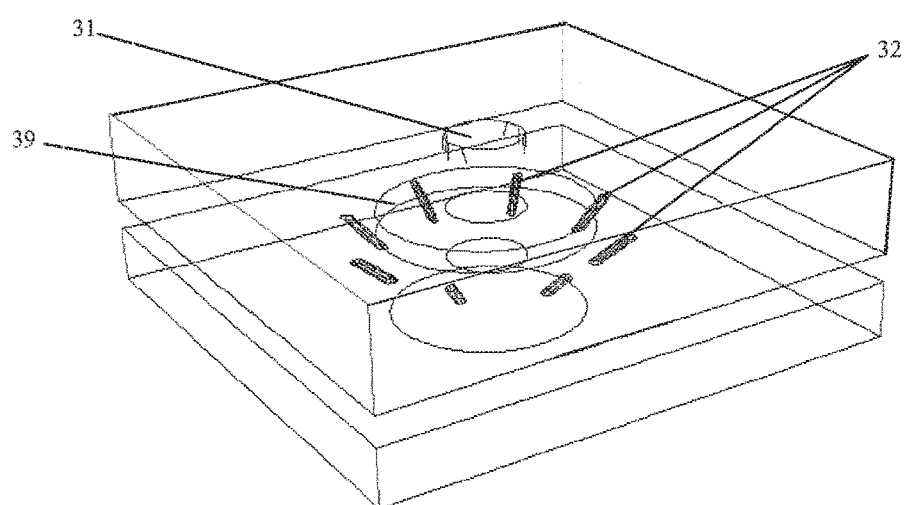

The present invention is described in the following in light of the accompanying drawing, showing an exemplary embodiment. In the drawing, FIG. 1 shows a schematic representation of a gas-turbine engine in accordance with the present invention, FIG. 2 shows an enlarged detail sectional view of a fastening area of a tile on a combustion chamber wall in accordance with an exemplary embodiment of the present invention, FIG. 3 shows an enlarged detail sectional view of a fastening area of a tile on a combustion chamber wall in accordance with an exemplary embodiment of the present invention, with elliptically rounded area, FIG. 4 shows an enlarged detail sectional view of a fastening area of a tile using a screw on a combustion chamber wall in accordance with an exemplary embodiment of the present invention, with elliptically rounded area between the tile and the thickened area of the tile necessary to accommodate the thread as well as a heat transfer improving structuring of the surface of this rounded area, FIG. 5 shows a schematic outer view of a bolt area of the combustion chamber wall, FIG. 6 shows a schematic perspective view of a bolt area of the combustion chamber wall, and FIG. 7 shows a schematic perspective view of a bolt area of the combustion chamber wall.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows in an enlarged and simplified representation the fastening area of a tile 30 on a combustion chamber wall 29. The combustion chamber wall 29 is also referred to as the tile carrier. A bolt 31 is fastened to the tile 30, for example by welding. The bolt can be designed as a screw bolt or a stud bolt. The exemplary embodiment shows a threaded bolt clamped against the combustion chamber wall 29 using a nut 38 with a washer 39 inserted between them.

In accordance with the invention, several impingement cooling holes 32 are provided in the combustion chamber wall 29, the center axes 33 of which being inclined relative to the plane of the combustion chamber wall 29. The center axes 33 of the impingement cooling holes 32 thus also form an angle to the center axis 34 of the bolt 31.

As FIG. 2 shows, the airflows passing through the impingement cooling holes 32 impact a transition area 35 between the bolt 31 and the tile 30. This transition area 35 is rounded. It is for example formed by a weld or by the joint casting of stud bolt and tile. The center axes 33 of the impingement cooling holes 32 are arranged such that they meet the tile in the surface formed by the rounded area and intersect at a common intersection point 40 located on the center axis 34 of the bolt 31. The result of this is an even and flow-optimized flow of cooling air onto the transition area 35.

FIG. 3 shows a view by analogy with FIG. 2. In accordance with the exemplary embodiment in FIG. 3, the bolt 31 is designed in one piece with the tile 30, for example by means of a casting process. The tile has for that purpose a thickened area 41, of which the transitional cross-section to the tile 30 is designed in the form of an elliptic or ellipsoid rounded area 42. This results in a high-strength transition between the bolt 31 and the tile 30 which is optimized for increasing the heat transfer by its enlarged surface.

FIG. 4 shows an alternative exemplary embodiment in which the thickened area 41 of the tile is provided with an internal thread. The bolt 31 is designed here in the form of a screw. To increase the heat transfer, it can be advantageous to provide the surface of the thickened area 41 or of the elliptic or toroid rounded area 42 with additional surface structures. These can be designed for example in the form of wave-like structures or ring-like structures. This too results in an improvement of the heat transfer.

In the exemplary embodiments shown, the thickened area 41 is ellipsoid or toroid. It is obvious that the thickened area can be designed with a rounding radius which is constant or variable perpendicular to the axis 34 of the stud bolt 31.

To additionally cool the fastening area of the bolt 31 at the tile 30, it can be particularly advantageous to provide one or more additional effusion holes 36 in the tile 30. The effusion hole 36 shown is located upstream of the bolt 31 relative to the flow through the combustion chamber. The cooling flow exiting the effusion hole additionally cools the bolt fastening area 37 of the tile 30. FIG. 5 shows a schematic outer view of a bolt area of the combustion chamber wall where the plurality of impingement cooling holes 32 are arranged asymmetrically around a circumference of the bolt 31. FIG. 6 shows a schematic perspective view of a bolt area of the combustion chamber wall where the four impingement cooling holes 32 are arranged symmetrically around a circumference of the bolt 31 and FIG. 7 shows a schematic perspective view of a bolt area of the combustion chamber wall where eight impingement cooling holes 32 are arranged symmetrically around a circumference of the bolt 31.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Combustion chamber wall
30 Tile
31 Bolt
32 Impingement cooling hole
33 Center axis
34 Center axis
35 Transition area
36 Effusion hole
37 Bolt fastening area
38 Nut
39 Washer
40 Intersection point
41 Thickened area
42 Rounded area

What is claimed is:

1. A gas turbine combustion chamber, comprising:
   a combustion chamber wall,
   a bolt having a center axis,
   a combustion chamber tile fastened to the combustion chamber wall by the bolt,
   at least three impingement cooling holes arranged around a circumference of the bolt with each of the at least three impingement cooling holes having a center axis intersecting a transition area between the bolt and the combustion chamber tile and also intersecting the center axis of the bolt at an intersection point on a hot gas side of the combustion chamber tile.

2. The gas turbine combustion chamber in accordance with claim 1, wherein the intersection point is arranged at a certain distance from a surface of the combustion chamber tile.

3. The gas turbine combustion chamber in accordance with claim 1, wherein the at least three impingement cooling holes are arranged evenly spread around the bolt.

4. The gas turbine combustion chamber in accordance with claim 1, wherein the at least three impingement cooling holes are arranged asymmetrically spread around the bolt.

5. The gas turbine combustion chamber in accordance with claim 1, and further comprising an effusion hole positioned in the combustion chamber tile upstream of the bolt relative to a flow direction of the combustion chamber for cooling the bolt fastening area.

6. The gas turbine combustion chamber in accordance with claim 1, wherein the bolt is a threaded bolt integrally cast on the combustion chamber tile.

7. The gas turbine combustion chamber in accordance with claim 1, wherein the combustion chamber tile includes a thickened area relative to another portion of the combustion chamber tile, the thickened area including an internal thread, and wherein the bolt is a screw screwed into the internal thread.

8. The gas turbine combustion chamber in accordance with claim 1, wherein the transition area is circular or elliptic torus-shaped in cross section.

\* \* \* \* \*